(12) United States Patent
Witemyre (10) Patent No.: US 11,229,888 B2
(45) Date of Patent: Jan. 25, 2022

(54) MIXING TEE ASSEMBLY AND PROCESS (71) Applicant: Floworks International LLC, Pasadena, TX (US)

(72) Inventor: Charles Jeffrey Witemyre, Orlando, FL (US)

(73) Assignee: FloWorks International, LLC, Houston, TX (US)

(*) Notice: Subject to any disclaimer, the term of this patent is extended or adjusted under 35 U.S.C. 154(b) by 519 days.

(21) Appl. No.: 16/068,439

(22) PCT Filed: Dec. 29, 2016

(86) PCT No.: PCT/US2016/069216
§ 371 (c)(1),
(2) Date: Jul. 6, 2018

(87) PCT Pub. No.: WO2017/120100
PCT Pub. Date: Jul. 13, 2017

(65) Prior Publication Data
US 2019/0001283 A1 Jan. 3, 2019

Related U.S. Application Data (60) Provisional application No. 62/276,689, filed on Jan. 8, 2016.

(51) Int. Cl.
*B01F 5/04* (2006.01)
*C01B 25/222* (2006.01)
(Continued)

(52) U.S. Cl.
CPC .......... *B01F 5/0463* (2013.01); *B01F 3/0865* (2013.01); *B01J 4/002* (2013.01);
(Continued)

(58) Field of Classification Search
None
See application file for complete search history.

(56) References Cited

U.S. PATENT DOCUMENTS 4,199,557 A * 4/1980 Barloy ................ B01F 3/04773
422/259
2015/0049575 A1 2/2015 Matula et al.

FOREIGN PATENT DOCUMENTS

CN 1363513 A 8/2002
CN 2669143 Y 1/2005
(Continued)

OTHER PUBLICATIONS

'Static Inline Mixer' (MIXRITE) Dec. 7, 2015. Retrieved from the Internet on Mar. 2, 2, 15-19, 2017. URL:<http:l/web.archive.org/web/201512071 00803/http://jetmixing.net/static_inlinemixer.html>.

(Continued)

*Primary Examiner* — Derek N Mueller
(74) *Attorney, Agent, or Firm* — Boulware & Valoir, PLLC (57) ABSTRACT A mixing tee assembly suitable for phosphate acid attack reaction is described. The mixing tee assembly comprises an outer pipe having a mixing end and a tee end, wherein a tee structure is formed near the tee end to connect with additional piping; an inner pipe comprising a nozzle end connected to a nozzle and a open end; wherein the inner pipe is lined with a corrosion-resistant material on its inside surface; wherein when the inner pipe is assembled within the outer pipe, the nozzle extends beyond the mixing end of the outer pipe by at least ⅓ of the inside diameter of the outer pipe.

15 Claims, 6 Drawing Sheets

(51) Int. Cl.
   *B01F 3/08*    (2006.01)
   *B01J 8/38*    (2006.01)
   *B01J 8/00*    (2006.01)
   *B01J 8/20*    (2006.01)
   *B01J 8/36*    (2006.01)
   *B01J 4/00*    (2006.01)

(52) U.S. Cl.
   CPC ............... *B01J 8/006* (2013.01); *B01J 8/20* (2013.01); *B01J 8/36* (2013.01); *B01J 8/388* (2013.01); *C01B 25/222* (2013.01); *B01F 2215/0036* (2013.01); *B01J 2208/003* (2013.01); *B01J 2208/00176* (2013.01); *B01J 2208/00867* (2013.01); *B01J 2208/00902* (2013.01)

(56) References Cited

FOREIGN PATENT DOCUMENTS

| CN | 201140044 | 10/2008 |
| CN | 103964560 A | 8/2014 |
| CN | 104349835 A | 2/2015 |
| WO | WO2017/120100 | 7/2017 |

OTHER PUBLICATIONS

'MFG & Dist of Inconel, Monel, Hastelloy and Nitronic Grades' (HPA) 3-5, 9, 15-19 Dec. 31, 2015. Retrieved from the Internet on Mar. 2, 2017. URL: <http://web.archive.org/web/20 151231 011214/ http:f/hpalloy .com/alloys/descriptions/HASTELLOYC_276. aspx>.

'Rubber Lined Piping: A Solution to Corrosion Resistance' (JAD) Nov. 22, 2013. Retrieved 11 from the Internet on Mar. 2, 2017. URL: <http://web.archive.org/web/20 131122042918/http:/lwww .piping-engineering.com/rubber-lined-piping-solution-to-corrosion-resistance.html>.

\* cited by examiner

MIXING TEE ASSEMBLY AND PROCESS

PRIOR RELATED APPLICATIONS

The present application is a National Phase filing under 35 U.S.C. § 371 of International Application PCT/US2016/069216, filed on Dec. 29, 2016, which claims priority to U.S. 62/276,689, Mixing tee assembly and process, filed Jan. 8, 2016, both applications are expressly incorporated in their entirety for all purposes.

FEDERALLY SPONSORED RESEARCH STATEMENT

Not applicable.

FIELD OF THE DISCLOSURE

This invention relates generally to a mixing tee assembly, and more specifically to a mixing tee assembly to be used in the production of phosphoric acid by attacking phosphate rocks with sulfuric acid.

BACKGROUND OF THE DISCLOSURE

Phosphoric acid is a mineral acid having the chemical formula $H_3PO_4$. Phosphoric acid is an important reactant in many modern day manufacturing, such as anodizing, buffer agent in biology and chemistry, catalyst, or even electrolyte in fuel cells. Phosphoric acid is an important component in agricultural products such as fertilizer.

Phosphoric acid is produced industrially by two general routes—the thermal process and the wet process, which includes two sub-methods. The wet process dominates in the commercial sector. The more expensive thermal process produces a purer product that is used for applications in the food industry. A background of the various processes for preparing phosphoric acid is beneficial to understand the importance of the invention.

Thermal Process.

Very pure phosphoric acid is obtained by burning elemental phosphorus to produce phosphorus pentoxide, which is subsequently dissolved in dilute phosphoric acid. This route produces a very pure phosphoric acid, since most impurities present in the rock have been removed when extracting phosphorus from the rock in a furnace. The end result is food-grade, thermal phosphoric acid; however, for critical applications, additional processing to remove arsenic compounds may be needed.

Elemental phosphorus is produced in an electric furnace. At a high temperature, a mixture of phosphate ore, silica and carbonaceous material produces calcium silicate, phosphorus gas (P) and carbon monoxide (CO). The P and CO off-gases from this reaction are cooled under water to isolate solid phosphorus. Alternatively, the P and CO off-gases can be burned with air to produce phosphorus pentoxide and carbon dioxide. Due to the high cost related to preparing elemental phosphorus, the thermal process is less prevalent in the commercial sector.

Wet Process.

Wet process phosphoric acid is prepared by adding sulfuric acid to tricalcium phosphate rock, typically found in nature as apatite. The reaction is:

where X may include OH, F, Cl, and Br.

The initial phosphoric acid solution may contain 23-33% $P_2O_5$ (32-46% $H_3PO_4$), but can be concentrated by the evaporation of water to produce commercial- or merchant-grade phosphoric acid, which contains about 54-62% $P_2O_5$ (75-85% $H_3PO_4$). Further evaporation of water yields super-phosphoric acid with a $P_2O_5$ concentration above 70%.

Digestion of the phosphate ore using sulfuric acid yields the insoluble calcium sulfate (gypsum), which is filtered and removed as phosphogypsum. Wet-process acid can be further purified by removing fluorine to produce animal-grade phosphoric acid, or by solvent extraction and arsenic removal to produce food-grade phosphoric acid.

The nitrophosphate process is similar to the wet process except that it uses nitric acid in place of sulfuric acid. The advantage to this route is that the coproduct, calcium nitrate is also a plant fertilizer. This method is rarely employed.

Diplo Process.

Improvement of the wet process has been developed to provide better crystallization and yield. The Diplo process is a variation of the standard Speichim Single Reactor process where phosphate rock is attacked in two stages within two reactors connected in series.

Phosphate rock is mixed with sulfuric acid in a reactor to create a phosphogypsum slurry. Agitation ensures high recirculation rate and mixing efficiency in order to obtain high yields and optimized crystallization. The heat of reaction is removed by air cooling with surface cooler-dispersers or other flash cooler apparatus.

Equipment for the acid-attack reaction includes, among others, mixing tee assemblies where the concentrated sulfuric acid is diluted and introduced into the reactor for easier handling. However, the dilution is accompanied by large amount of heat that makes the acid mixing tee assembly more vulnerable to the already corrosive sulfuric acid, especially at the nozzle that sprays the concentrated sulfuric acid.

The mixing tee has concentric inner pipe and outer pipe terminating in a nozzle where the fluid from the inner pipe and the concentric chamber created by the inner and out concentric pipe mix. The concentrated sulfuric acid is introduced through the inner pipe and is diluted with return or recycle acid recovered from the reactor that is introduced into the concentric chamber. It has been proposed to coat the nozzle with PTFE or using PTFE-lined pipe in the immediate mixing area to reduce the corrosive damage to the pipes. However, such modification still cannot avoid sulfuric acid trapped in the mixing end of the inner and outer pipes, because of the turbulent flow inherent with the nozzle spray. More specifically, the turbulent flow at the space between the inner pipe and the outer pipe makes it unlikely to discharge all the sulfuric acid from the nozzle, leaving at least some residual sulfuric acid trapped in the pipes that will eventually cause harm to the pipes.

Further, the conventional PTFE liner does not fit tightly enough with the inner pipe to prevent sulfuric acid from seeping into the gap between liner and the pipe. This problem is especially prevalent under high temperature caused by the dilution/mixing of sulfuric acid, where the gap would be further widened by heat expansion. These problems all result in quickly deteriorated mixing tee assemblies that require replacement.

Thus, what is needed is an improvement of the mixing tee assembly that has better corrosion-resistance and longer life cycle.

SUMMARY OF THE DISCLOSURE

The current invention is the improvement solving the above-mentioned issues. The mixing tee assembly comprises an outer pipe having a mixing end and a tee end, wherein a tee structure is formed near the tee end to connect with additional piping; an inner pipe comprising a nozzle end connected to a nozzle and a open end; wherein the inner pipe is lined with a corrosion-resistant material on its inside surface; wherein when the inner pipe is assembled within the outer pipe, the nozzle extends beyond the mixing end of the outer pipe by at least ⅓ of the inside diameter of the outer pipe, more preferably ⅔ of the inside diameter of the outer pipe. Alternatively, the nozzle extends beyond the mixing end of the outer pipe by at least 4 inches (101.6 mm), more preferably 6 inches (152.4 mm), and even more preferably 8 inches (203.2 mm).

In one embodiment, the invention describes a mixing tee assembly comprising an outer pipe having a mixing end and a tee end, wherein a tee structure is formed near the tee end and having at least one return acid inlet to connect with additional piping; an inner pipe comprising a nozzle end connected to a nozzle and an acid inlet; wherein the inner pipe is lined with a corrosion-resistant material on its inside surface; wherein when the inner pipe is assembled concentrically within the outer pipe, the nozzle extends beyond the mixing end of the outer pipe by at least ⅓ of the inside diameter of the outer pipe, or by at least 4 inches.

In this embodiment the outer pipe is made of high-density polyethylene (HDPE). The inner pipe is made of a corrosion-resistant alloy, preferably a nickel-molybdenum-chromium wrought alloy, and more preferably Hastelloy® C-276 manufactured by Haynes International, Inc. Kokomo, Ind., US.

The corrosion-resistant material in this embodiment is petrafluorethylene (PTFE), polypropylene, polyvinylidene fluoride (preferred brand Kynar® PVDF by Arkema, Inc., Philadelphia, Pa., US), or combinations thereof, more preferably PTFE. To achieve optimal corrosion-resistance and prolong equipment life, the inner pipe is preferably lined with the corrosion-resistant material throughout its entire length.

In this embodiment, the nozzle is made of the same corrosion-resistant material that lines the inner pipe, which is PTFE.

In addition, the inner pipe is preferably covered with a corrosion protecting material on its outer surface. The corrosion-protecting material can be any known material that can withstand corrosion by sulfuric acid and/or phosphoric acid, and in a preferred embodiment is rubber.

In this embodiment, the nozzle can extend beyond the mixing end of the outer pipe by at least ⅔ of the inside diameter of the outer pipe, or by at least 6 inches.

Moreover, to obtain better lifespan, tight fitting is provided between the nozzle, the inner pipe and the corrosion-resistant material liner, so that minimum amount of acid would contact the inner pipe, thus avoiding substantial corrosion.

In another embodiment, a mixing tee assembly is described, comprising an outer pipe having a mixing end and a tee end, wherein a tee structure is formed near the tee end to connect with additional piping, wherein the outer pipe is made of high-density polyethylene (HDPE); an inner pipe comprising a nozzle end connected to a nozzle and an open end, wherein the inner pipe is made of a nickel-molybdenum-chromium alloy; wherein the inner pipe is lined on its inside surface with a corrosion-resistant material comprising petrafluorethylene (PTFE), polypropylene, polyvinylidene fluoride (Kynar®), or combinations thereof; wherein when the inner pipe is assembled within the outer pipe, the nozzle extends beyond the mixing end of the outer pipe by at least ⅓ of the inside diameter of the outer pipe.

In yet another embodiment, a method is described for producing phosphoric acid in a reaction tank where a mixing tee assembly is coupled to the reaction tank, comprising the steps of: introducing phosphate rocks into the reaction tank that contains a reactor slurry supplied from a flash cooler; introducing fresh sulfuric acid into the reaction tank through the inner pipe of the mixing tee assembly, wherein the sulfuric acid reacts with the phosphate rock to produce a product slurry containing phosphoric acid ($P_2O_5$); recycling return acid from the product slurry, wherein the return acid is mixed with the sulfuric acid in step b) through the outer pipe of the mixing tee assembly.

In this embodiment, the reactor slurry is maintained at a temperature of 80° C. or lower, and more preferably 75° C. or lower, in order to avoid any burning or degradation of the PTFE.

Also, the return acid comprises about 20-25% phosphoric acid, and more preferably about 21% phosphoric acid to dilute the fresh sulfuric acid, which comprises about 98% $H_2SO_4$.

For optimal conditions, the temperature of the fresh sulfuric acid is 60° C. or lower because the dilution at the nozzle will generate a great amount of heat that may damage the piping and the nozzle. Moreover, the temperature around the nozzle is maintained at 90° C. or lower, more preferably at about 80° C.

This novel design has proven to be a very effective tool for proper mixing of concentrated sulfuric acid in the phosphate acid attack reactor with the recycle acid from the downstream filters. There is an extremely volatile exothermic reaction at the point where this mixing takes place in the reactor. Tremendous amounts of heat and very corrosive dilute sulfuric acid are concentrated at the tip of this mixing tee. A combination of PTFE (Teflon), rubber lining and high nickel alloy pipe to protect and extend the life expectancy of the inner pipe of our novel mixing tees and assembly.

The mixing tee assembly of this invention will be assembled using suitable materials for the inner pipe, such as Hastelloy® C-276 Schedule 40 pipe, with a suitable thickness for optimal strength and cost effectiveness, for example, a 0.375" wall thickness as the base metal. Any welding of this pipe is preferably in accordance with ASTM procedures, and all welds would be non-destructively examined using dye penetrant and PMI testing. In a preferred embodiment, material test reports of the chemicals and physical pipe characteristics would be required for all materials in this assembly. After fabrication, the exterior of the Hastelloy® C-276 inner pipe is then preferably rubber lined or coated using ¼" thick rubber, for example from Blair Hotline Enduraflex™ (Blair Rubber Company, Seville, Oh., US) that is then hot cured to add additional corrosion and abrasion resistance. To protect the interior surface of the Hastelloy® C-276 inner pipe, a ½" thick extruded tube of petrafluorethylene (PTFE) pure virgin Teflon is precisely machined to provide a tight interference fit between the tip of the Hastelloy pipe and the Teflon tube.

Polytetrafluoroethylene is a synthetic fluoropolymer of tetrafluoroethylene that has numerous applications. It is a high-molecular-weight compound consisting wholly of carbon and fluorine. PTFE is hydrophobic, i.e. neither water nor water-containing substances wet PTFE, which makes it suitable in the harsh environment full of acidic solutions. PTFE has one of the lowest coefficients of friction against any solid, thus making it also suitable for anti-abrasion coating. PTFE is very non-reactive, partly because of the strength of carbon-fluorine bonds.

The Teflon tube provides additional corrosion protection for the Hastelloy pipe and extends the life expectancy of the mixing tee significantly if the Teflon seal at the tip is maintained. The precise fit of this Teflon inner tube and unique method of securing it and the extended Teflon nozzle to the pipe all contribute to the improvement of this inventive mixing tee assembly.

The outer pipe of the novel mixing tee assembly receives the recycle acid from the downstream filter to provide both a dilution and cooling effect for the inner Hastelloy pipe. Maintaining an optimal ratio of recycle acid to sulfuric acid is an important consideration to the efficient production of the phosphoric acid. Keeping a constant flow of the recycle acid is also critical to dispersal of the heat of reaction from the sulfuric acid. If the flow is interrupted, the tip of the mixing tee will quickly be "burned" by the huge amounts of heat given off and greatly shorten the life expectancy of the mixing tee assembly.

HDPE is used for the outer pipe material because of its availability, low cost and proven ability to handle the corrosion, abrasion and resistance to build up inherent in the phosphorus acid process. The combination of the outer pipe made in HDPE and the inner pipe using a combination of Hastelloy, Teflon and rubber lining is designed for use in many fertilizer plants as well as other applications. outer pipe The novel nozzle design provides for extending the mixing end of the inner pipe beyond the outer pipe.

The inner pipe extends a length from the outer pipe to allow for a better flow and dispersal of the dilute sulfuric acid into the main attack tank where it can react with the phosphate rock to produce the phosphoric acid. The conventional design without the proper extension trapped the sulfuric acid in the mixing end of the HDPE outer pipe and could cause elevated temperatures that could shorten the life of the entire mixing tee assembly.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
| --- | --- |
| HDPE | High density polyethylene |
| PTFE | Polytetrafluoroethylene |
| PP | Polypropylene |
| Kynar | polyvinylidene fluoride |

DESCRIPTION OF EMBODIMENTS OF THE INVENTION

The invention provides a novel mixing tee assembly specifically designed for improved life expectancy of the assembly as well as providing better mixing results in the production of phosphoric acid. A detailed description of the novel mixing tee will be made with reference to the drawings. The drawings are not necessarily to scale and for illustrative purposes.

There are five typically used processes for phosphoric production, including Dihydrate (DH) process, Hemihydrate process (HH), Di-Hemihydrate (DHH) process, Hemi-Dihydrate (HDH) process (single stage), and Hemi-Dihydrate process (double-stage). Different processes are needed for different rocks and gypsum disposal systems. Among them, DH process is the most commonly used one.

Figure 1:
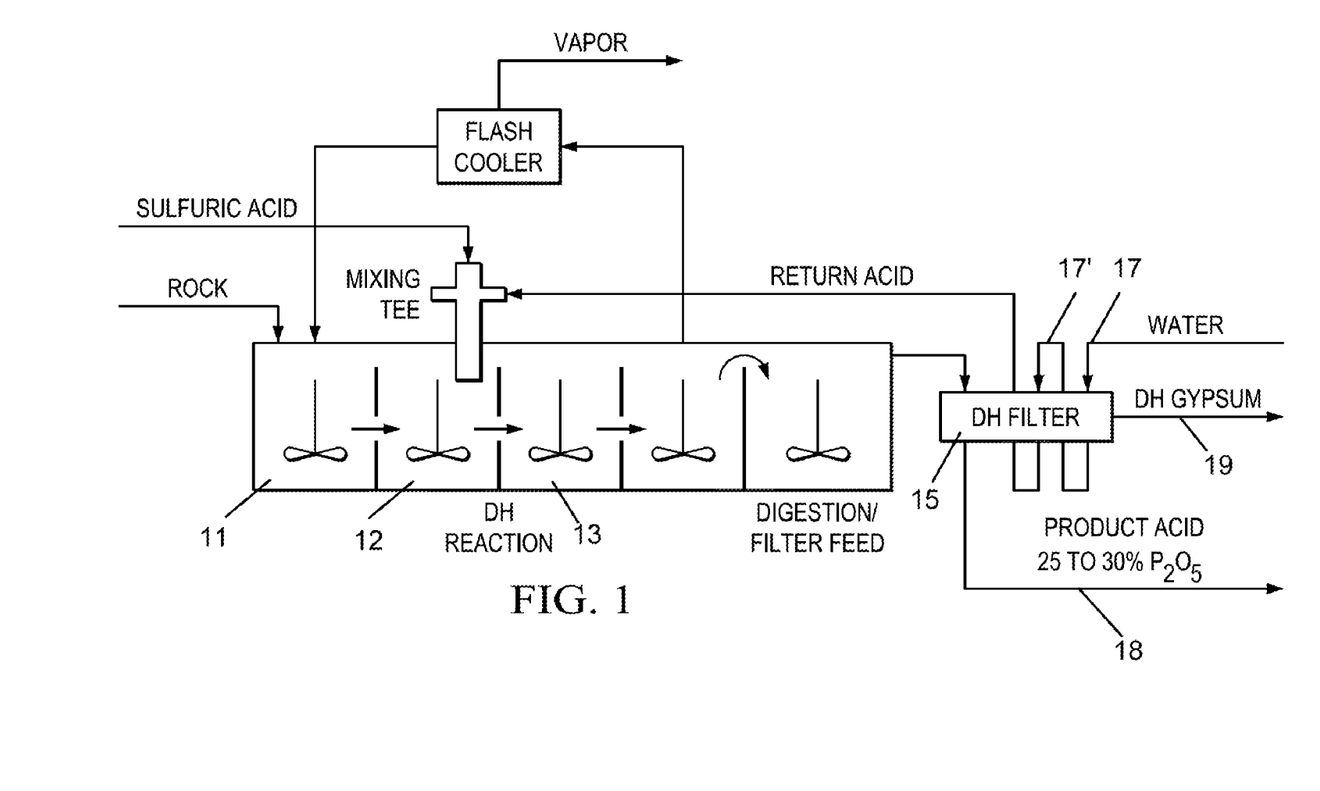
FIG. 1. A schematic view of the phosphoric acid manufacturing.

In a typical DH process, four stages are included: grinding, reaction, filtration and concentration stages, as shown in FIG. 1. The grinding stage is not shown in FIG. 1, as certain grades of commercial rock do not need grinding.

In the reaction stage, the tricalcium phosphate is converted by reaction with concentrated sulphuric acid into phosphoric acid and insoluble calcium sulphate, as shown in FIG. 1. The mixing tee assembly is used in phosphoric acid reaction and filtration process in the phosphoric acid production. In the first reactor compartment 11, phosphate rock and reactor slurry from the Flash Cooler (described below) are added. Sulfuric acid is diluted with return acid from the DH filter in a mixing tee and then added into the second reactor compartment 12 of the reactor. In the third reactor compartment 13, the Flash Cooler Circulation Pump (not shown) sends reactor slurry to the Flash Cooler which is used to maintain the reactor slurry temperature at 80° C. The reaction compartments maintain an agitated reaction volume in circulation.

The operating conditions for dihydrate precipitation are 26-32% $P_2O_5$ and 70-80° C. This temperature is controlled by passing the reactor slurry through a flash cooler, which also de-gasses the slurry and makes it easier to pump. The cooled reactor slurry is then added back to the first compartment 11 of the reactor.

In the filtration stage, phosphoric acid is separated from calcium sulphate dihydrate. Typically, five tons of gypsum are being generated for every ton of product acid produced. Therefore the reactor slurry is first filtered by DH filter 15 to recover product acid at 25 to 30% $P_2O_5$. Then the gypsum cake from the DH filter 15 is washed using two countercurrent water washes 17, 17'. The filtrate from the second wash 17' is pumped to the reactor as return acid. The product acid 18 is transported for downstream processing, and the resulted DH gypsum 19 is disposed of.

In the concentration stage, liquid water is evaporated by bringing the acid into contact with hot combustion gas from a burner.

A mixing tee assembly is used to feed sulfuric acid and return acid into the reactor. This dilutes the sulfuric acid in order to control the local concentration and temperature at the discharge point which helps avoid coating of the phosphate rock and can reduce citrate insoluble (CI) losses.

Figure 2:
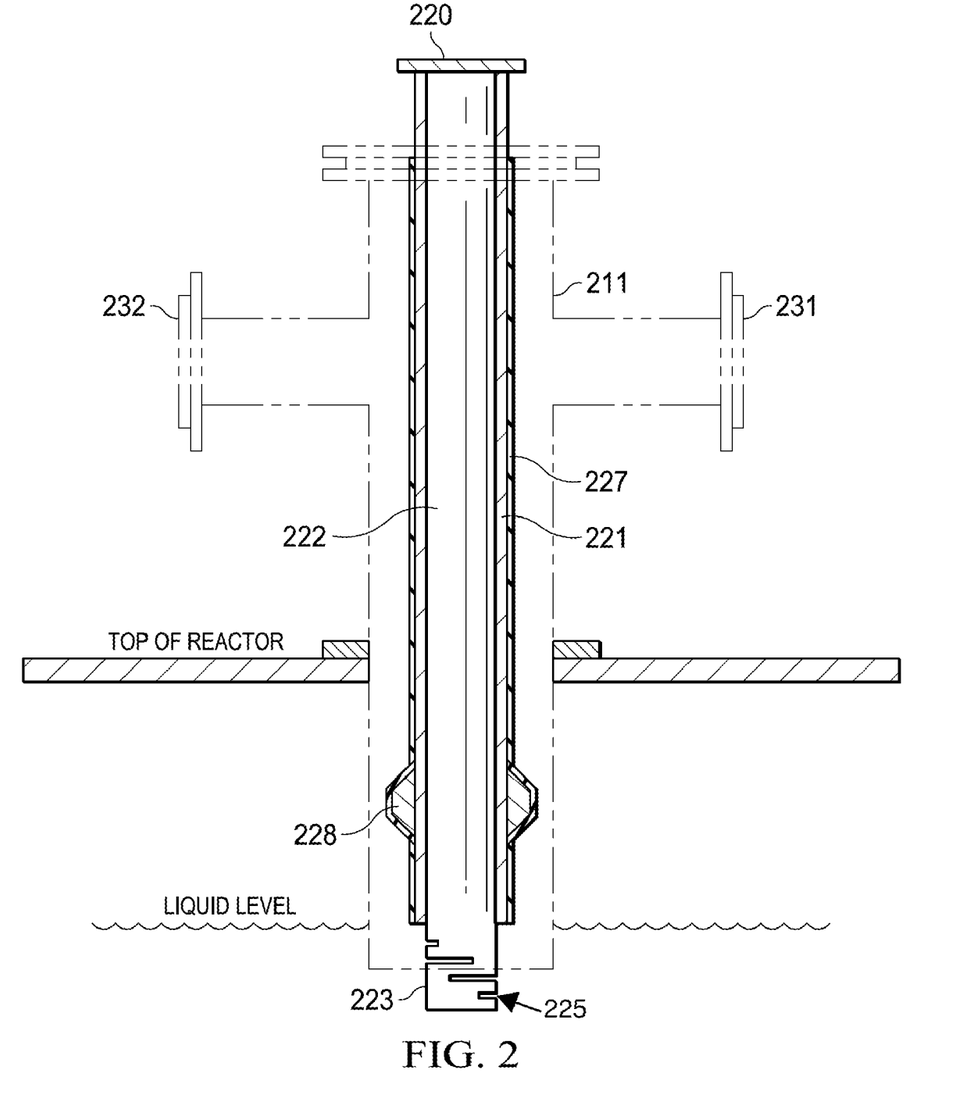
FIG. 2. A cross section of the pipes with a view of the placement with the mixing tee assembly.

Please refer to FIG. 2, which shows a schematic view of the mixing tee of the present invention. The mixing tee is made up of two concentric pipes 211, 221. The return acid stream from the filter is split and enters through two side inlets 231, 232 feeding the outer HDPE pipe 211. The sulfuric acid enters through the top nozzle 220 which feeds the inner Hastelloy pipe 221. The inner Hastelloy pipe 221 is lined with Teflon with the surface of the inner pipe indicated at 222. The coated surface runs the entire length of the interior of the pipe and extends beyond the outer pipe 211 forming the discharge nozzle 223. The slots 225 are arranged in a radial pattern for discharging the sulfuric acid, which is mixed with the return acid from DH filter 15 (as shown in FIG. 1) to ensure proper mixing. The return acid from DH filter 15 flows into the cylindrical space created by the outer surface of the inner pipe and the inner surface of the outer pipe. The Hastelloy pipe 221 has an outer rubber coating 227 to protect against corrosion and abrasion caused by solids in the return acid stream. Rubber coated "fins" 228 are attached along the inner pipe to keep it aligned in the center.

Figures 3A, 3B, 3C:
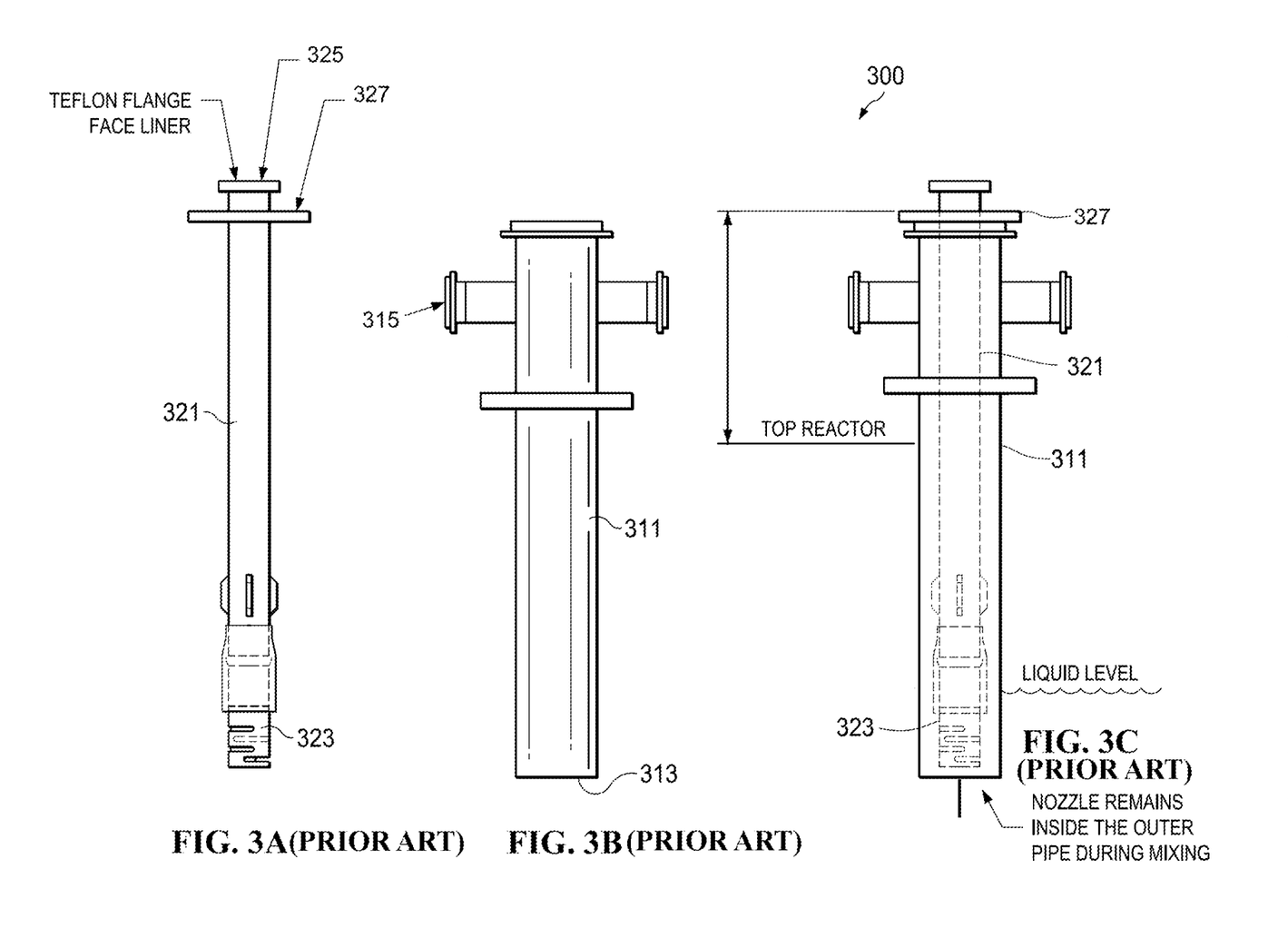
FIG. 3A. A cross-section of an inner pipe of a conventional mixing tee assembly.
FIG. 3B. A cross-section of an outer pipe of a conventional mixing tee assembly.
FIG. 3C. A cross-section of a conventional mixing tee assembly showing the placement of the inner pipe.

Please refer to FIG. 3A-C, which shows a conventional mixing tee assembly, where FIG. 3A shows the inner pipe 321, FIG. 3B shows the outer pipe 331, and FIG. 3C shows the assembly 300 when the inner pipe and the outer pipe 311 are assembled together. The conventional mixing tee assembly 300 comprises an outer pipe 311 that has an mixing end 313, and an inner pipe 321 that has a nozzle 323 corresponding to the mixing end 313 of the outer pipe 311. Typically the inner pipe 321 has 200 mm (8") smaller flange 325 made of Hastelloy C-276 P lined with a 1" thick Teflon face liner 325, and a 450 mm (18") diameter larger flange 327 made of 316 stainless steel, the two flanges 325, 327 being spaced 150 mm (6") apart. The inner can have a length of 3020 mm (9 to 19.983 feet) from the larger flange 327 to the nozzle end 323. The inner pipe 321 for example can have 200 mm (8") inner diameter that is made of Schedule 40 ("SCH 40") Hastelloy C-276 with a thickness of 0.375" wall, having ½" thick inner Teflon liner on the inside, and ¼" high temperature rubber coating on the outside. The nozzle 323 can be a standard nozzle used in the field, or a customized nozzle for a specific use.

In FIG. 3B that shows the outer pipe 311, which as a full extension of 1200 mm (37.28") including the two side connectors 315. The side connectors 315 are 203.2 mm (8") in diameter, and are used to further connect to additional pipes. The outer pipe 311 also have an outer flange 317 that is 950 mm (37.4") in diameter.

In FIG. 3C, the assembly 300 shows the inner pipe 321 assembled with the outer pipe 311. It is shown that even when the inner pipe 321 is fully inserted into the outer pipe 311, the nozzle 323 remains inside the outer pipe 311 because the flange 327 prevents the inner pipe 321, thus the nozzle 323, from protruding out of the mixing end 313. This would reduce the mixing efficiency while a certain amount of sulfuric acid remaining inside the outer pipe 311 for an extended period of time would cause damage to the pipes and liners therein.

Figure 3D:
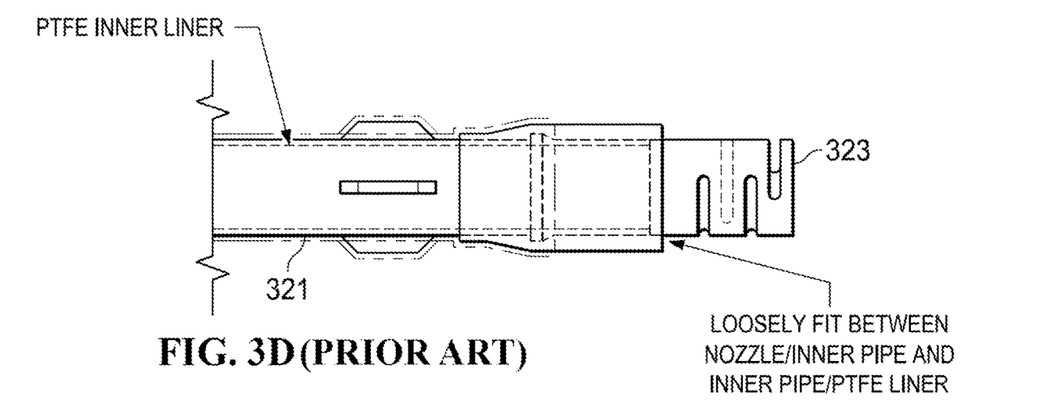
FIG. 3D. A blow-up view focusing on the nozzle and the inner pipe.

Further referring to FIG. 3D, which shows only the inner pipe 321 and the nozzle part 323 of the inner pipe. As seen in FIG. 3B, the conventional mixing tee assembly has loosely fit PTFE liner inside the inner pipe 321, leaving gaps between the two that may allow sulfuric acid to seep in. Similar gaps can be found between the nozzle 323 and the end of the inner pipe 321, thus also allowing sulfuric acid to seep in the gaps and damage the inner pipe. These shortcomings are addressed in the novel design of this application.

Figure 4A:
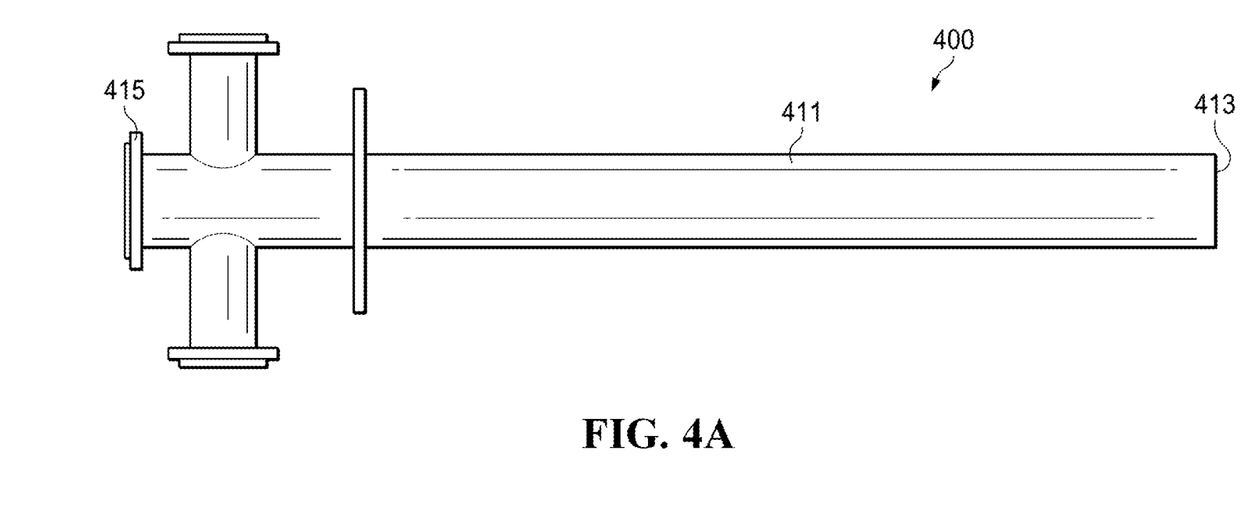
FIG. 4A. A cross-section of the outer pipe of the inventive mixing tee assembly.
Figure 4B:
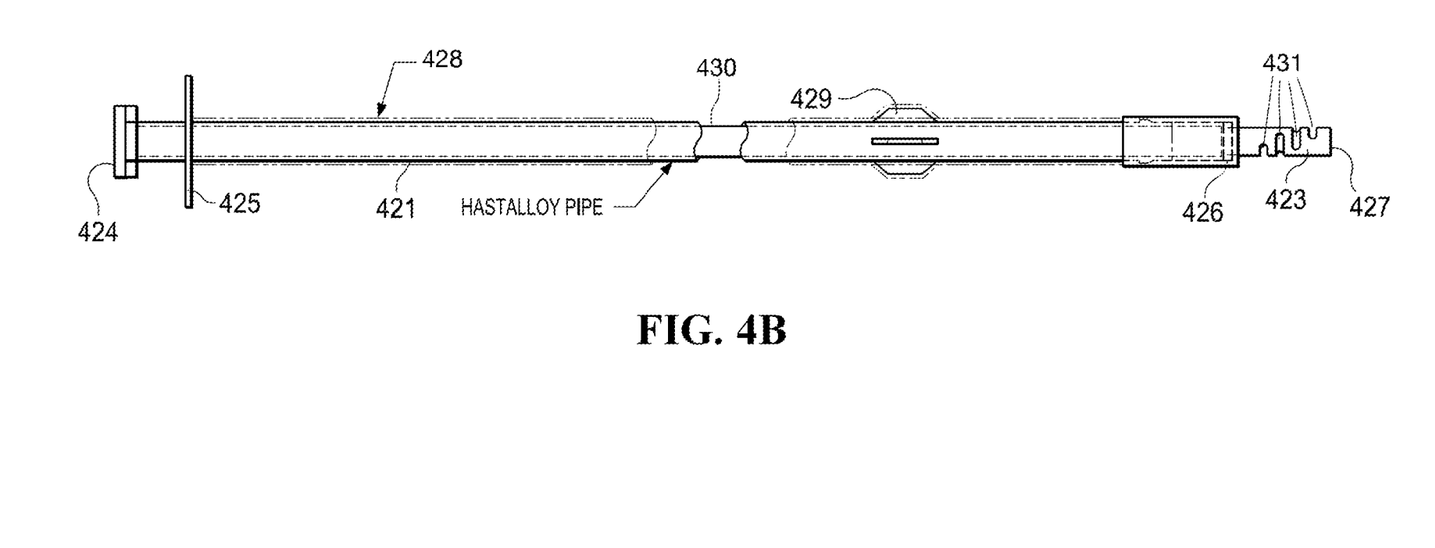
FIG. 4B. A cross-section of the inner pipe of the inventive mixing tee assembly.

FIGS. 4A-B show the components of the mixing tee assembly 400 that generally comprises an outer pipe 411 and an inner pipe 421 to be inserted in the outer pipe 411. The inner pipe is inserted in the outer pipe in a similar manner as shown in FIG. 3C. The outer pipe 411 has a mixing end 413 on the one end, and a tee end having a stopping flange 415 on the other end, where a tee structure is located near the stopping flange 415 for connecting to further piping for receiving the return acid.

As shown in 4B the inner pipe 421 has a nozzle 423 on the one end, and a stopping flange 425, corresponding to the stopping flange 415 of the outer pipe 411. At the opposite end of the nozzle on the inner pipe is the opening 424, for introducing sulfuric acid, such that when inserted into the outer pipe 411, the inner pipe 421 will have a predetermined position therein. The nozzle has least 4 semi-circular radial slots 431 that are approximately 1" wide. In this embodiment the slots are placed about 2" from the end of nozzle 427, where two adjacent ones are at least 30 degree overlapped around the circumference. The inner pipe 421 further comprises a nozzle stop 426 toward the nozzle 423 so as to prevent the nozzle 423 from retracting into the inner pipe 421.

The inner diameter of the outer pipe 411 can be varied depending on the application and the scale of the process. In this embodiment the inner diameter is about 14.531" (369.08 mm), but can be varied as needed. The corresponding diameter and size of the inner pipe would change as well.

The outer diameter of the inner pipe 421 can be varied according to the outer pipe 411 to provide suitable flowing condition. In this embodiment the outer diameter is 8 inches (203.2 mm). Further, an annular spacer 429 or alignment fins are provided to keep the inner pipe 421 in the center of the outer pipe 411. The spacer or alignment fins may be rubber coated.

FIG. 4B illustrated the inner pipe with cut outs to show the layers of material used in the manufacture. The outer surface of the inner pipe 421, preferably from stop flange 425 to the nozzle stop 426, is covered by rubber 428 or other suitable material for resistance to corrosion by the acid. The thickness of the rubber layer can be varied depending on technical necessity. In this embodiment the rubber is Enduraflex™ Hotline rubber by Blair Rubber Company, OH, US, having a thickness of about ¼ inch. However, the thickness and length coverage of the rubber 428 can vary depending on different processes.

The inner pipe 421 is made of a corrosion-resistant alloy while maintaining sufficient mechanical integrity due to its smaller diameter, especially thermal expansion in high temperature environment. In this embodiment Sch 40 Hastelloy® C-276 is used for the inner pipe 421. Hastelloy® C-276 alloy is a nickel-molybdenum-chromium wrought alloy that is generally considered a versatile corrosion-resistance alloy. Hastelloy® C-276 exhibits the required corrosion resistance as well as the suitable mean coefficient of thermal expansion. However, other suitable alloys or materials may also be used as long as the required corrosion-resistance and mechanical integrity can be maintained.

The inner pipe 421 is also lined with PTFE 430 at its inner surface throughout its length to provide additional corrosion and abrasion resistance. The PTFE liner extends from one end of the opening 424 all the way to the nozzle stop 426 near the nozzle 423, so that the interior of the inner pipe 421 is thoroughly protected from any corrosion as well as abrasion that may be the result of any impurities in the acid. Other suitable lining materials may include, for example, polypropylene, polyvinylidene fluoride (Kynar®), or combinations thereof.

It is to be noted that as opposed to the prior art where only the nozzle is lined with PTFE, the whole length of the inner pipe 421 is lined with PTFE to provide longer life of the assembly. In addition, by precisely measuring the inside diameter of the inner pipe's interior stop 426 welded to the tip of the inner pipe, and then machining the outer diameter of the PTFE nozzle preferably to within approximately $1/100$ of an inch, the nozzle is then press-fit into the interior stop ring 426 and energize the seal by using a corrosion-resistant spring for a tight seal while withstanding broader temperature range and chemical attack. Such tight fitting contribute to maximum corrosion resistance by not allowing any acid to flow into any gap that may occur between the PTFE liner 430 and the inner pipe 421.

Figure 4C:
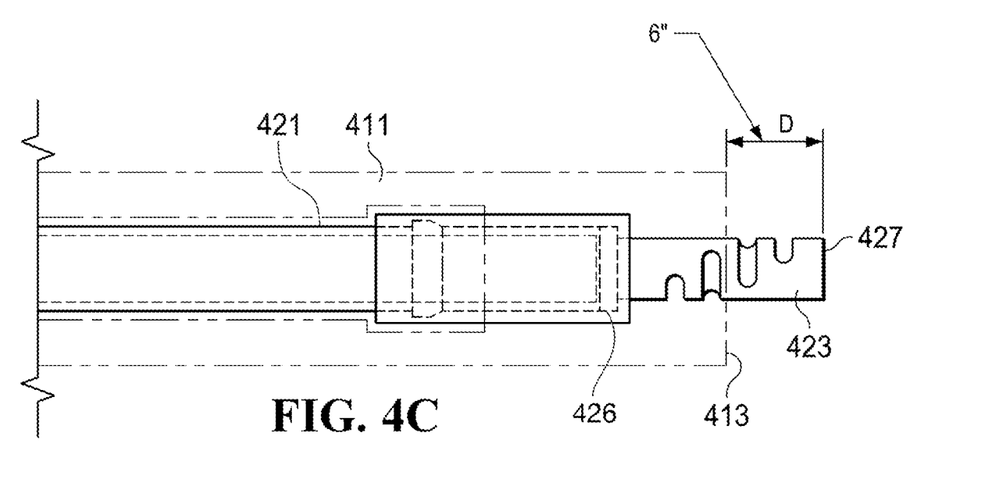
FIG. 4C. A blow-up view focusing on the nozzle.

Referring now to FIG. 4C, which shows the portion of mixing tee assembly near the mixing end 413. The outer pipe 411 is dotted to contrast the protrusion of the nozzle 423 out from the mixing end 413. Another important feature of this assembly is that the end 427 of the nozzle 423 is extended at least beyond the mixing end 413 of the outer pipe 411 by a distance D, so as to improve the dispersal of the sulfuric acid inside the reactor vessel. Such improvement effectively eliminates the possibility of trapping very hot/diluted sulfuric acid in the bottom section of the outer pipe 411, thus preventing the deterioration of the mixing tee assembly. The distance D nozzle 423 extends beyond the mixing end 413 of the outer pipe 411 is at least $1/3$ of the inside diameter of the outer pipe 411 to effectively prevent the trapping of sulfuric acid. More preferably, the distance D is at least $2/5$ of the inside diameter of the outer pipe 411. In this embodiment where the inside diameter of the pipe 411 is about 14.5" (368.3 mm), the distance D is at least 6" (152.4 mm).

Alternatively, the distance D is at least 4" (101.6 mm), more preferably 6" (152.4 mm), and even more preferably 8" (203.2 mm) beyond the end of the outer pipe for optimal mixing results as well as protecting the nozzle from burning.

The extended nozzle diminishes burning pipes caused by sulfuric dilution, especially around the mixing area near the nozzle, which directly contribute to longer life of the mixing tee assembly.

The present disclosure also describes a method of producing sulfuric acid by using the mixing tee assembly of this invention. The method comprises introducing phosphate rocks into the reaction tank that also contains a reactor slurry supplied from a flash cooler; introducing fresh sulfuric acid into the reaction tank through the inner pipe of the mixing tee assembly wherein the sulfuric acid reacts with the phosphate rock to produce a product slurry containing phosphoric acid ($P_2O_5$). Further recycling return acid from the product slurry, wherein the return acid is mixed with the sulfuric acid through the outer pipe of the mixing tee assembly. The mixing tee assembly as described above provides corrosion-enduring characteristics that increases the efficiency of the production process and reduces the costs of maintenance.

The present disclosure also describes a mixing tee assembly, comprising an outer pipe having a mixing end and a tee end, wherein a tee structure is formed near the tee end and having at least one return acid inlet to connect with additional piping. The mixing tee assembly also comprises an inner pipe having a nozzle end connected to a nozzle and an acid inlet, in which the inner pipe is lined with a corrosion-resistant material on its inside surface. In the assembly, when the inner pipe is assembled concentrically within the outer pipe, the nozzle extends beyond the mixing end of the outer pipe by at least $1/3$ of the inside diameter of the outer pipe, or by at least 4 inches.

The mixing tee assembly according to the present disclosure, in which the outer pipe is made of anti-corrosion material, for example high-density polyethylene (HDPE).

The mixing tee assembly according to the present disclosure, in which the inner pipe is made of a corrosion-resistant alloy, which can be a nickel-molybdenum-chromium wrought alloy, and more preferably Hastelloy® C-276.

The mixing tee assembly according to the present disclosure, in which the corrosion-resistant material is petrafluorethylene (PTFE), polypropylene, polyvinylidene fluoride (Kynar®), or combinations thereof, and more preferably PTFE.

The mixing tee assembly according to the present disclosure, in which the inner pipe is lined with the corrosion-resistant material throughout the length of the inner pipe.

The mixing tee assembly according to the present disclosure, in which the nozzle is made of the corrosion-resistant material.

The mixing tee assembly according to the present disclosure, in which the inner pipe is covered with a corrosion protecting material on its outer surface, which can be rubber.

The mixing tee assembly according to the present disclosure, in which the nozzle extends beyond the mixing end of the outer pipe by at least $2/5$ of the inside diameter of the outer pipe. For example, if the inner diameter of the outer pipe is 10 inches, then the nozzle extends beyond the mixing end of the outer pipe by at least 4 inches. Or alternatively, the nozzle extends beyond the mixing end of the outer pipe by at least 6 inches regardless of the inner diameter of the outer pipe.

The mixing tee assembly according to the present disclosure, in which tight fitting is provided between the nozzle, the inner pipe, and the corrosion-resistant material liner. Preferably, the gap between the nozzle, the inner pipe, and the corrosion-resistant material liner is less than $1/100$ inch.

Moreover, the cost of fresh sulfuric acid is quite high, and therefore the optimum method to effectively use the sulfuric acid in the reaction, as well as recycling it, will affect the overall cost of producing phosphoric acid. Efficient use of sulfuric will reduce the overall cost. Also, reducing waste material and damage caused by excessive heat will also improve the process efficiency and bring down the cost of production less unwanted by-products such as calcium sulfate. These benefits are realized by the extended nozzle that effectively reduces the local heat generation and eliminates the trapped acid. Also, the replacement of mixing tee components is reduced due less wear on the assembly.

While the invention is described above in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

What is claimed is:

1. A mixing tee assembly configured to mix corrosive acid, comprising:
   a) an outer pipe having a mixing end and a tee end, wherein a tee structure is formed at the tee end and having two return acid inlets for a return acid stream to flow through two tee pipes into the outer pipe;
   b) an inner pipe comprising a nozzle end connected to a nozzle having multiple outlet slots arranged in a radial pattern and an acid inlet opposite the nozzle end;
   c) said inner pipe is lined with a corrosion-resistant material on its inside surface;
   d) said inner pipe is placed concentrically within the outer pipe with a circular nozzle stop ring placed between the nozzle and the inner pipe to prevent the nozzle from retracting into the inner pipe; and
   e) the nozzle extends beyond the mixing end of the outer pipe by at least ⅓ of the inside diameter of the outer pipe or by at least 4 inches.

2. The mixing tee assembly of claim 1, wherein the outer pipe is made of high-density polyethylene (HDPE).

3. The mixing tee assembly of claim 1, wherein the inner pipe is made of a corrosion-resistant alloy.

4. The mixing tee assembly of claim 3, wherein the corrosion-resistant alloy is a nickel-molybdenum-chromium wrought alloy.

5. The mixing tee assembly of claim 3, wherein the corrosion-resistant alloy is a nickel-chromium-molybdenum alloy.

6. The mixing tee assembly of claim 1, wherein the corrosion-resistant material lining the inside surface of the inner pipe is selected from the group of petrafluorethylene (PTFE), polypropylene, polyvinylidene fluoride, or combinations thereof.

7. The mixing tee assembly of claim 1 wherein the nozzle is made of the corrosion-resistant material.

8. The mixing tee assembly of claim 1, wherein the inner pipe is covered with a corrosion protecting material on its outer surface.

9. The mixing tee assembly of claim 8, wherein the corrosion-protecting material on the outer surface of the inner pipe is rubber.

10. The mixing tee assembly of claim 1, wherein the nozzle extends beyond the mixing end of the outer pipe by at least ⅔ of the inside diameter of the outer pipe.

11. The mixing tee assembly of claim 1, wherein the nozzle extends beyond the mixing end of the outer pipe by at least 6 inches.

12. A method of producing phosphoric acid in a reaction tank where a mixing tee assembly of claim 1 is mounted on a reaction tank, comprising the steps of:
   a) introducing phosphate rocks into the reaction tank that contains a reactor slurry supplied from a flash cooler;
   b) introducing fresh sulfuric acid into the reaction tank through the inner pipe of the mixing tee assembly, wherein the sulfuric acid reacts with the phosphate rock to produce a product slurry containing phosphoric acid ($P_2O_5$);
   c) recycling return acid from the product slurry,
   wherein the return acid is mixed with the sulfuric acid in step b) through the outer pipe of the mixing tee assembly.

13. A mixing tee assembly configured to mix corrosive acid, comprising
   a) an outer pipe made of high-density polyethylene (HDPE) having a mixing end and a tee end, wherein a tee structure is formed at the tee end having two return acid inlets for a return acid stream to flow through tee pipes into the outer pipe;
   b) an inner pipe comprising a nozzle end connected to a nozzle having multiple outlet slots arranged in a radial pattern and an acid inlet opposite to the nozzle end, wherein the inner pipe is made of a nickel-molybdenum-chromium alloy;
   c) said inner pipe is lined on its inside surface with a corrosion-resistant material selected from the group consisting of petrafluorethylene (PTFE), polypropylene, polyvinylidene fluoride or combinations thereof;
   d) said inner pipe is placed concentrically within the outer pipe, with a circular nozzle stop ring placed between the nozzle and the inner pipe to prevent the nozzle from retracting into the inner pipe and the nozzle extends beyond the mixing end of the outer pipe by at least ⅓ of the inside diameter of the outer pipe; and
   e) multiple fins attached to the outer surface of the inner pipe to centrally align the inner pipe within the outer pipe.

14. The mixing tee assembly of claim 13, wherein the nickel-molybdenum-chromium alloy is a nickel-chromium-molybdenum alloy.

15. The mixing tee assembly of claim 13, wherein the nozzle extends beyond the mixing end of the outer pipe by at least ⅔ of the inside diameter of the outer pipe.

* * * * *

UNITED STATES PATENT AND TRADEMARK OFFICE
CERTIFICATE OF CORRECTION

PATENT NO. : 11,229,888 B2
APPLICATION NO. : 16/068439
DATED : January 25, 2022
INVENTOR(S) : Charles Jeffrey Witemyre It is certified that error appears in the above-identified patent and that said Letters Patent is hereby corrected as shown below:

On the Title Page

Please replace the Title Page with the attached Title Page showing the corrected number of claims.

In the Claims

On Column 12, after Line 50, Insert Claims 16, 17, 18, 19 and 20 as follows:
--16. The method of claim 12, wherein the reaction slurry is maintained at 80° C. or lower.
17. The method of claim 12, wherein the return acid comprises about 20-25 % phosphoric acid
18. The method of claim 12, wherein the fresh sulfuric acid comprises about 98% H2SO4.
19. The method of claim 12, wherein the temperature of the fresh sulfuric acid is 60° C. or lower.
20. The method of claim 12, wherein the temperature around the nozzle is maintained at 90° C. or lower.--

Signed and Sealed this
Twenty-ninth Day of November, 2022

Katherine Kelly Vidal
*Director of the United States Patent and Trademark Office*

(12) United States Patent
Witemyre (10) Patent No.: US 11,229,888 B2
(45) Date of Patent: Jan. 25, 2022

(54) MIXING TEE ASSEMBLY AND PROCESS

(71) Applicant: Floworks International LLC, Pasadena, TX (US)

(72) Inventor: Charles Jeffrey Witemyre, Orlando, FL (US)

(73) Assignee: FloWorks International, LLC, Houston, TX (US)

( * ) Notice: Subject to any disclaimer, the term of this patent is extended or adjusted under 35 U.S.C. 154(b) by 519 days.

(21) Appl. No.: 16/068,439

(22) PCT Filed: Dec. 29, 2016

(86) PCT No.: PCT/US2016/069216
§ 371 (c)(1),
(2) Date: Jul. 6, 2018

(87) PCT Pub. No.: WO2017/120100
PCT Pub. Date: Jul. 13, 2017

(65) Prior Publication Data
US 2019/0001283 A1  Jan. 3, 2019

Related U.S. Application Data

(60) Provisional application No. 62/276,689, filed on Jan. 8, 2016.

(51) Int. Cl.
*B01F 5/04* (2006.01)
*C01B 25/222* (2006.01)
(Continued)

(52) U.S. Cl.
CPC .......... *B01F 5/0463* (2013.01); *B01F 3/0865* (2013.01); *B01J 4/002* (2013.01);
(Continued)

(58) Field of Classification Search
None
See application file for complete search history.

(56) References Cited

U.S. PATENT DOCUMENTS 4,199,557 A * 4/1980 Barloy ............... B01F 3/04773
422/259
2015/0049575 A1  2/2015 Matula et al.

FOREIGN PATENT DOCUMENTS

CN  1363513 A  8/2002
CN  2669143 Y  1/2005
(Continued)

OTHER PUBLICATIONS

'Static Inline Mixer' (MIXRITE) Dec. 7, 2015. Retrieved from the Internet on Mar. 2, 2, 15-19, 2017. URL:<http:l/web.archive.org/web/201512071 00803/http://jetmixing.net/static_inlinemixer.html>.

(Continued)

*Primary Examiner* — Derek N Mueller
(74) *Attorney, Agent, or Firm* — Boulware & Valoir, PLLC (57) ABSTRACT

A mixing tee assembly suitable for phosphate acid attack reaction is described. The mixing tee assembly comprises an outer pipe having a mixing end and a tee end, wherein a tee structure is formed near the tee end to connect with additional piping; an inner pipe comprising a nozzle end connected to a nozzle and a open end; wherein the inner pipe is lined with a corrosion-resistant material on its inside surface; wherein when the inner pipe is assembled within the outer pipe, the nozzle extends beyond the mixing end of the outer pipe by at least ⅓ of the inside diameter of the outer pipe.

20 Claims, 6 Drawing Sheets